United States Patent [19]

Ferguson

[11] 4,093,384
[45] June 6, 1978

[54] NARROW ANGLE, NARROW BANDWIDTH OPTICAL RECEIVER SYSTEM

[75] Inventor: Gerald D. Ferguson, Yardley, Pa.

[73] Assignee: The United States of America as represented by the Secretary of the Navy, Washington, D.C.

[21] Appl. No.: 729,523

[22] Filed: Oct. 4, 1976

[51] Int. Cl.² .............................................. G01J 3/48
[52] U.S. Cl. ..................................... 356/186; 356/209
[58] Field of Search ......................... 356/4, 5, 186, 189, 356/209–212; 250/203 R; 350/162

[56] References Cited

U.S. PATENT DOCUMENTS

| 3,515,480 | 6/1970 | Altman et al. ............................ 356/4 |
| 3,589,815 | 6/1971 | Hosterman ............................ 356/4 X |
| 3,615,135 | 10/1971 | Frazer ............................ 356/5 |
| 3,712,985 | 1/1973 | Swarner et al. ............................ 356/4 X |
| 3,942,890 | 3/1976 | Malone ............................ 356/5 X |

OTHER PUBLICATIONS

Benson et al., Nerem Record, Nov. 1962, pp. 34 and 35.
Dixon, Electronics, Apr. 19, 1963, pp. 39–43.
Davy, Journal of Scientific Instruments, vol. 42, No. 8, Aug. 1965, pp. 536 and 537.
Lehr et al., Applied Optics, vol. 11, No. 2, Feb. 1972, pp. 300–304.

*Primary Examiner*—F. L. Evans
*Attorney, Agent, or Firm*—R. S. Sciascia; Henry Hansen; William J. Iseman

[57] ABSTRACT

A narrow angle, narrow bandwidth optical receiver system for detecting light rays reflected from a predetermined area illuminated by a laser beam having a known wavelength. A large collecting lens having a small field of view receives incoming reflected rays which are collimated by a pair of relay lenses having a narrow bandwidth, triple cavity, single element interference filter positoned therebetween. The filtered rays are processed by a photomultiplier tube and a CRT display to illustrate signals of interest within the illuminated area. An alternate embodiment provides a cone element to receive filtered rays from relay lenses for decreasing the size of the receiver system.

11 Claims, 5 Drawing Figures

NARROW ANGLE, NARROW BANDWIDTH OPTICAL RECEIVER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to optical receiver systems and particularly to a narrow angle, narrow bandwidth optical receiver system for indicating signals of interest within a predetermined area illuminated by a laser beam having a known wavelength.

In a reconnaissance system it is often desirable to detect and track objects of interest or targets disposed and submersed within a predetermined area. For example, an aircraft such as a helicopter would hover or traverse an area above a water body while directing a laser beam from the aircraft into the water body for search and detection of submersed objects of interest. Light rays reflected from the illuminated area, including rays both from a detected object and unwanted reflections such as sun rays are all radiated back toward the aircraft which employs an optical receiver system designed to receive the laser generated light reflections and to filter out undesirable reflections such as those generated by the sun. One prior art method used in the detection of such reflected rays requires the utilization of a relatively large diameter interference filter array positioned at the input to the optical system for transmitting the desired radiation and inhibiting transmission of background noise radiation such as sun light. A correspondingly large collecting lens in conjunction with the filter provides maximum collection of optical energy with a minimal spectral bandpass in long range detection applications where light is at a premium. The large diameter filter, however, is usually constructed with a narrow bandpass of 25 angstroms (A) or less. A good quality, large optical filter array is relatively expensive and difficult to construct. Additionally, after a period of time the array deteriorates from separation of the various bonded layers.

SUMMARY OF THE INVENTION

Accordingly, an object of the present invention is to provide a narrow angle, narrow bandwidth optical receiver system which employs only a single element, narrow bandwidth interference filter having a relatively small diameter compared to the larger diameter collecting lens. Another object of the invention is to provide an optical receiver system having a narrow bandwidth of substantially 10 A and a small field of view of 10° or less. A further object of the present invention is to provide an optical receiver system having minimum transmission losses due to the reception of off-axis rays of a particular wavelength. Yet a further object of the invention is to provide an optical receiver system having a minimum size suitable for aircraft application.

Briefly, these and other objects are accomplished by a narrow angle, narrow bandwidth optical receiver system for detecting light rays reflected from a predetermined area illuminated by a laser beam having a known wavelength. A large collecting lens having a small field of view receives incoming reflected rays which are collimated by a relay lens pair having a narrow bandwidth, triple cavity, single element interference filter positioned therebetween. Spectral shifts within the filter due to the reception of off-axis rays are accommodated by the filter having a flat top transmission response over a narrow bandwidth. The filtered signals are received and processed by a photomultiplier tube and a CRT display which illustrates signals of interest within the illuminated area. An alternate embodiment provides a cone element to receive the filtered rays from the relay lenses for decreasing the length of the receiver system measured along the optical axis from the collecting lens to the active surface of the photomultiplier tube.

For a better understanding of these and other aspects of the invention reference may be made to the following detailed description taken in conjunction with the accompanying drawings.

DESCRIPTION OF THE PREFERRED EMBODIMENT

Figure 1:
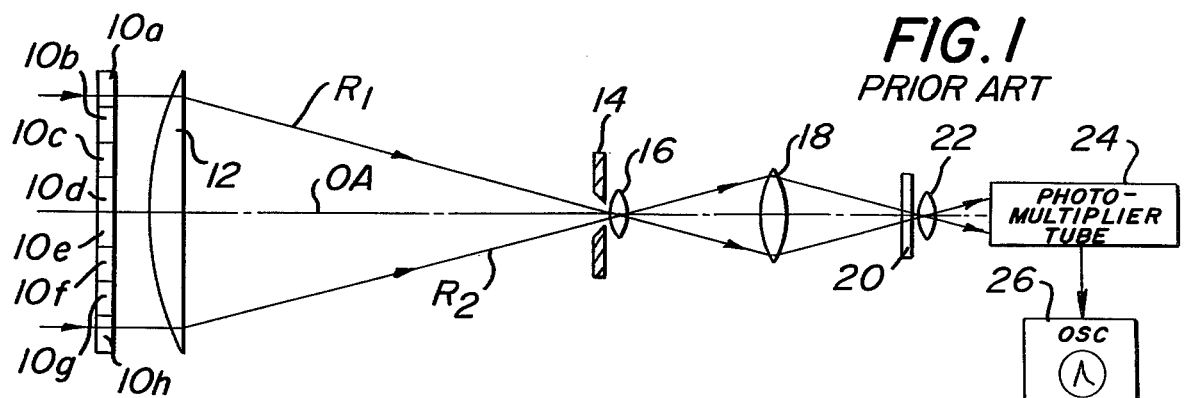
FIG. 1 illustrates an optical receiver system in the prior art.

Referring now to FIG. 1, there is illustrated one example of an optical receiver system employed in the prior art. An array of interference filter segments 10a–h is positioned at the optical input of the system to receive and filter incoming light rays generated either by a laser source or reflected from an area illuminated by a laser beam. Two such reflected rays are designated $R_1$ and $R_2$ and are shown as being reflected from various elements within the optical system. Positioned to the rear of the filter segments 10a–h is a collecting lens 12 having a relatively large diameter, for example of 15 to 18 inches, designed to collect as much of the reflected radiation as possible within a given area. The relatively large diameter of such a lens becomes very helpful when operating an optical receiver system at a long distance, usually 1000 feet or greater, from the ilumated area or laser source. Correspondingly, the filter segments 10a–h are arranged and bonded in a stacked fashion to provide an equally large diameter sufficient to intercept all incoming rays which may be collected on any portion of the collecting lens 12. Central to both the filter segments 10a–h and the lens 12 as well as other structural optical elements of the system is an optical axis OA. The composite filter formed by the array segments provides a typical bandpass of approximately 25 A and is used to filter out the desired radiation of a particular wavelength against background noise radiation such as sunlight. After being collected by the lens 12, the incoming rays are focused by an aperture plate 14 having a chamfered opening formed at the center thereof to form an iris plane normal to the optical axis. The opening in the plate 14 is used to provide a desired field of view, usually of less than 10°. Positioned behind the aperture plate 14 and centered about the optical axis is a field lens 16 which serves to collect the off-axis rays at various fields of view while imaging the collecting lens 12 onto a relay lens 18 positioned to the rear of the field lens 16 and normal to the optical axis and concentric therewith. The relay lens 18 transfers the iris plane to a second focal plane wherein a neutral density filter 20 or other conventional structure such as occulting discs are inserted. A second field lens 22 is positioned to the rear of the filter 20 and is used to contain the off-axis rays of light while imaging the relay lens 18 to a sensitive photomultiplier tube 24. The output of the photomultiplier tube 24 is connected to a CRT display device such as an oscilloscope 26 which illustrates detected radiation signals.

Figure 2:
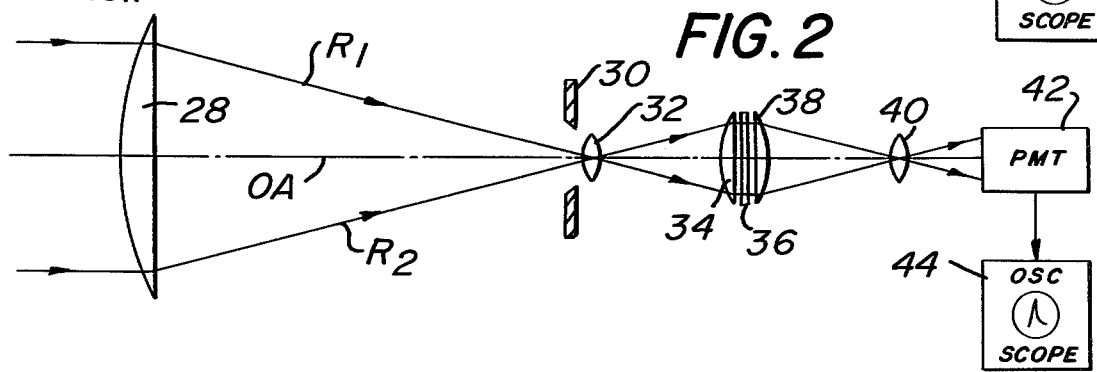
FIG. 2 illustrates an optical receiver system according to the present invention.

Referring now to FIG. 2, there is illustrated a preferred embodiment of an optical receiver system made according to the present invention. Similar to FIG. 1, a collecting lens 28 is positioned at the optical input to the receiver system and normal to the optical axis and concentric therewith. An aperture plate 30 is positioned rearward of the lens 28 and has an opening therethrough to provide an iris plane for maintaining a relatively small field of view on the order of 10° or less. A first field lens 32 is positioned rearward of the aperture plate 30 and collects all off-axis rays at various fields of view while imaging the collecting lens 28 onto a first relay lens 34. The incoming rays $R_1$, $R_2$ are collimated between the first relay lens 34 and pass through an interference filter 36 to a second relay lens 38. The rays are collimated in the region between the two relay lenses 34, 38 to permit the filter 36 to have a very narrow bandpass on the order of 10 A. In order to provide such a narrow bandpass the filter 36 is of a triple cavity, single element design having transmission characteristics which permit the reception of off-axis rays while maintaining a high transmission level. The filtered and collimated radiation is then transmitted from the second relay lens 38 to a second field lens 40 which images the relay lens 38 onto the sensing portion of a radiation actuated element such as a photomultiplier tube (PMT) 42. The output of the tube 42 is connected to a CRT display device such as an oscilloscope 44.

The interference filter 36 minimizes transmission losses from off-axis optical rays impinging upon the receiver system. Unlike the illustrated prior art system shown in FIG. 1, the optical system of the present invention does not require a large expensive filter array to be placed in front of an equally large collecting lens. Rather, a single element inexpensive lens such as that shown in FIG. 2 may be utilized to accomplish maximum transmission of both normally incident and off-axis incoming rays. Assuming for example, that the diameter of the collecting lens is on the order of 15 to 18 inches, the diameter of the single element interference filter 36 may be typically one third the former value or approximately 5 to 6 inches. Morever, the cost involved of producing such a relatively small interference filter are on the order of two magnitudes lower than the cost involved in producing the large filter array shown in FIG. 1. The field angle $\theta_{FOV}$ of the optical receiver system is magnified as it enters the filter by the ratio $X_2/X_1$ of the separation distances between the collecting lens 28 and the filter 36. The magnification $M$ is given by the following equation:

$$M = \frac{X_2}{X_1} = \frac{\text{Diameter of Filter}}{\text{Diameter of Collecting Lens}} \quad (1)$$

wherein $M$ is always substantially less than unity. The rays entering the filter 36 at the extremities thereof impinge at an angle $\theta_F$ defined by the equation:

$$\theta_F = \theta_{FOV}/M \quad (2)$$

As light enters the filter 36 at an angle off the optical axis the shift in the filter peak $\Delta\lambda$ is given by the equation:

$$\Delta\lambda = \lambda_n - \lambda_n \sqrt{\frac{N^2 - \sin^2\theta}{N}} \quad (3)$$

wherein $\lambda_n$ equals the peak wavelength at normal incident angles, $\theta$ equals the incident angle, and $N$ equals the index of refraction of the filter. For a given filter bandwidth $\Delta\lambda$, the maximum angle $\theta$ which can be used is given by the equation:

$$\theta_{max} = N\sqrt{\frac{2\Delta\lambda}{\lambda}} \quad (4)$$

Figure 3A:
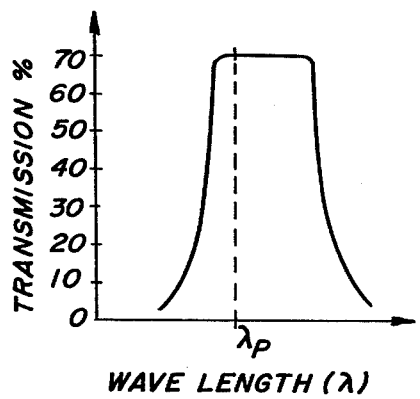
FIGS. 3(A and B) graphically illustrates filter transmission characteristics utilized in the invention shown in FIG. 2.
Figure 3B:
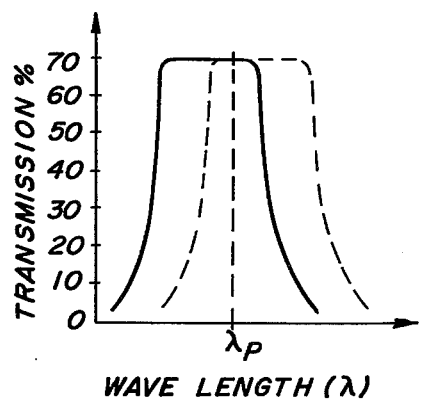

For example, if $\Delta\lambda = 10$ A, and $\lambda = 5320$ A, then with a high index material for example, $N = 2.0$, the $\theta_{max}$ is calculated to be 7° or 122 milliradians. With an optical system having a magnification of ⅓, equations (2) indicates a maximum total field of view of 82 milliradians or 4.6°. In order to provide maximum filter transmission, a triple cavity high index filter with a transmission characteristic such as shown in FIG. 3A is utilized. The filter 36 has a flat top response with maximum transmission of light of the desired wavelength $\lambda_p$ and with normal incidence occurring at the left edge of the filter response curve below the wavelength $\lambda_p$. At the maximum angle of incidence, the original filter curve as noted by the dotted line shifts left toward a lower wavelength spectrum as shown in FIG. 3B and as denoted by the solid line. In FIG. 3B the desired wavelength $\lambda_p$ is positioned at the right edge of the filter response with yet a high value of transmission on the order of 70 percent. Assuming, for example, that a laser beam is generating light in the bluegreen spectrum for detection of targets in a marine environment, the desired wavelength $\lambda_p$ is approximately 5320 A and, in the illustration of FIG. 3A, is placed within the green portion of the light spectrum. Accordingly, upon the reception of off-axis rays away from the optical axis noted in FIG. 2, the bandpass characteristic of filter 26 shifts left into the blue part of the light spectrum. Thus the bandpass of the filter 36 which is approximately 10 A and which offers substantially 70 percent transmission response during the reception of both normally incident and off-axis rays, offers a high value of light transmission under varying operating conditions. Combining a very small field of view on the order of 10° or less along with a narrow bandpass filter of approximately 10 angstroms having a transmission response capable of processing both normally incident rays and also off-axis rays provides an optical receiver system combination which permits a high degree of detection and classification of targets of interest within a relatively small target area while excluding background noise radiation such as sunlight. Filters having a number of cavities greater than three may also be utilized to achieve similar narrow bandwidths. The photomultiplier tube 32 shown in FIG. 2 converts the incoming collimated and filtered radiation into an analog output suitable for driving a CRT display such as the oscilloscope 44. The oscilloscope 44 displays the radiation signals which by their amplitude and time durations represent the shape of objects detected within the illuminated area.

In the preferred embodiment, the receiver system was F/1 and the collecting lens 28 was formed of plastic having a focal length of 15 inches and a diameter of 15 inches. The aperture plate 30 provided a field of view of approximately 4° and the field lens 32 was positioned 15 inches along the optical axis to the rear of the collecting lens and had a focal length of 3.75 inches and a diameter of 1.05 inches. The relay lenses 34 and 38 had equal focal lengths and diameters of 5 inches and were spaced approximately 1 inch apart. The lens 40 had a diameter of 1.05 inches and a focal length of 1.5 inches and was positioned 5 inches to the rear of lens 38 and 1.5 inches forward of the PMT 42. The PMT 42 had an active circular surface of 1.5 inches diameter.

Figure 4:
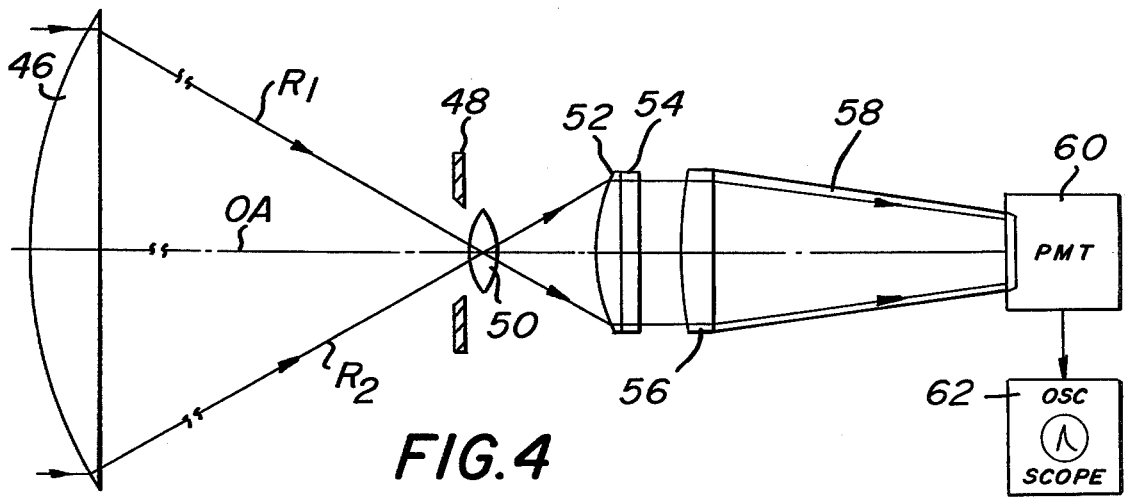
FIG. 4 illustrates an alternate embodiment of the invention having a cone element for decreasing the size of the receiver system.

Referring now to FIG. 4, there is illustrated an alternate embodiment of the present invention wherein the optical receiver system incorporates a solid cone element 58 which permits a decrease in the length of the optical system. Similar to the structure of the preferred embodiment shown in FIG. 2, the optical system of FIG. 4 is provided with a relatively large diameter collecting lens 46 which focuses incoming rays such as $R_1$ and $R_2$ through an opening in an aperture plate 48 forming an iris plane which limits the field of view to a predetermined angle, preferably of 10° or less. The field lens 50 is positioned behind the plate 48 and images the collecting lens 46 onto a first relay lens 52. A narrow bandpass, triple cavity, single element interference filter 54, having the size and characteristics of the filter discussed with reference to FIGS. 2 and 3, is disposed intermediate the first relay lens 52 and a second relay lens 56 which collimate the incoming rays therebetween. The collimated and filtered rays are received at the wide end of the cone element 58 which funnels the rays onto the active surface of the PMT 60. The element 58 is preferably made of glass and is provided with a silver coating on the exterior cone surface thereof for maximum reflection of the incoming rays. The effect of using the cone element 58 in the optical system of the present invention is to provide for a decrease in length of the distance between the collecting lens 46 and the PMT 60. As noted hereinbefore, the PMT 60 provides an output to an oscilloscope 62 which displays the detected signal.

In the alternate embodiment, the optical system was F/1 and the collecting lens 46 was formed of plastic having a focal length of 15 inches and a diameter of 15 inches. The aperture plate 48 provided a field of view of approximately 4° and the field lens 50 was positioned 15 inches along the optical axis to the rear of the collecting lens and had a focal length of 3.75 inches and a diameter of 1.05 inches. The relay lens 52 had a focal length of 5 inches and a diameter of 5 inches and was placed adjacent the front surface of the interference filter 54 which was positioned 5 inches along the optical axis to the rear of the aperture plate 48. The relay lens 56 had a diameter of approximately 5 inches, and a focal length of 5 inches, and was placed approximately 1 inch from the rear of the lens 52. The cone element 58 had a length along the optical axis of approximately 2 inches and had a diameter of approximately 1.5 inches at the narrow end to coincide with the active surface area of the PMT 60. The ultimate effect of using a cone like funnelling element in the optical system of the present invention is to decrease the length of the optical path between the collecting lens and photomultiplier tube by approximately 4.5 inches, assuming F/1 structured systems that employ relatively large collecting lenses as aforenoted. The shorter optical path so achieved thus permits a more compact assembly to be installed in airborne systems wherein space requirements are often stringent.

Thus it may be seen that there has been provided a novel narrow angle, narrow bandwidth, optical receiver system that permits the use of an inexpensive, relatively small, single element, narrow bandwidth interference filter having a high transmission response while processing both normally incident and off-axis incoming radiation.

Obviously, many modifications and variations of the invention are possible in light of the above teachings. It is therefore to be understood that within the scope of the appended claims the invention may be practiced otherwise than as specifically described.

What is claimed is:

1. An optical system for receiving radiation reflected from an area illuminated by light of a specific frequency, comprising, in combination:

receiving means adapted to receive the reflected radiation over a narrow field of view for forming an imaged output, said receiving means including a circular collecting lens positioned at the input thereof;

interference filter means optically connected to receive said receiving means output including a flat top filter element in which said specific frequency is at the low end of the bandpass for normal incidence of radiation and at the high end for maximum incidence of radiation; and detector means optically connected to receive the passed radiation from said filter means for producing an output signal when said detector means is illuminated by radiation at the specific frequency.

2. An optical system according to claim 1 further comprising display means connected to receive said detector means output signal for producing a visual representation thereof.

3. An optical system according to claim 1 wherein said filter means further comprises:

a pair of collimating lenses, one of said pair being connected to receive said receiving means output and the other of said pair for passing the collimated filtered radiation to said detector means.

4. An optical system according to claim 3 wherein said detector means further comprises:

a field lens optically connected to receive the collimated and filtered radiation from said interference filter means for forming an imaged output representative thereof; and a radiation actuated detector element connected to receive said field lens imaged output for producing said detector means output signal when illuminated by said field lens imaged output.

5. An optical system according to claim 3 wherein said detector means further comprises:

a solid cone element optically connected to receive at the wide end thereof the collimated and filtered radiation from said interference filter means for funnelling the radiation to the narrow end thereof; and a radiation actuated detector element connected to receive the funnelled radiation from said cone element for producing said detector means output signal when illuminated by the funnelled radiation.

6. An optical system according to claim 4 wherein the field of view of said receiving means is a maximum of 10°.

7. An optical system according to claim 6 wherein the bandpass region of said filter element is substantially 10 angstroms.

8. An optical system according to claim 5 wherein said solid cone element has a radiation reflective coating on the exterior surface thereof.

9. An optical system according to claim 8 wherein the field of view of said receiving means is a maximum of 10°.

10. An optical system according to claim 9 wherein the bandpass region of said filter element is substantially 10 angstroms.

11. An optical system according to claim 1 wherein said filter element consists of at least three cavities.

* * * * *